Patented Apr. 28, 1931

1,802,473

UNITED STATES PATENT OFFICE

PAUL FRANÇOIS JOSEPH LEBRUN, OF PARIS, FRANCE

MANUFACTURE OF LUMINESCENT TUBES

No Drawing.   Application filed December 12, 1927.   Serial No. 239,596.

This invention relates to an improved method of controlling the manufacture of luminescent tubes, and the objects of the invention are to effect economy in the operation by enabling a more rapid and exact control to be made of the various exhausting operations.

In the manufacture of luminescent tubes, it is desirable that in addition to subjecting the electrodes to a scavenging operation by treatment in an atmosphere of suitable gases, that the tube itself should also be exhausted to a very high degree of vacuum and treated with a scavenging gas, through which a high tension current is passed. This scavenging gas may be nitrogen, or a mixture of neon and helium, or neon alone and may, in some instances, contain small quantities of alcohol vapour, a high tension current of the order of ten thousand volts being passed through the scavenging gases while in the luminescent tubes.

The purpose of this scavenging action is to disengage all impurities, including gases, from the surface of the tubes, and to remove all traces of hydrogen and nitrogen from the interior of the tube in order that it may be possible to introduce and maintain a pure gas as a final filling, such pure gas being usually helium or neon, or other gas of a character to produce luminescence of a desired color when a current is passed therethrough in the usual way.

During the scavenging and exhausting operation, various chemical as well as physical changes in the gas mixture take place, and it is possible to utilize these changes to form an exact control in the method of manufacture of tubes through the use of the spectroscope, the spectra of which form an exact indication of the characteristics of the gaseous mixture within the tube from time to time.

In practicing the present invention, the luminescent tube, of any suitable form, is connected to a vacuum pump capable of producing a high degree of vacuum, and to a supply of quite pure filling gas, suitable connections being provided whereby the interior of the tube may be connected alternatively to either the vacuum pump or the supply of filling gas, or again to the supply of scavenging gas.

Means are also provided to enable a high tension current to be passed between the electrodes of the luminescent tube during the scavenging operation. A spectroscope is also arranged adjacent to the tube in such a way that when the high tension current is passed through the tube, during the scavenging operation, and during the subsequent exhaust, the spectrum thereof may be observed by the operator.

As every material has its own spectrum, when the high tension electrical discharge is passed through the tube which has not been completely exhausted, and into which the scavenging gas, for example nitrogen, has been introduced after initial exhaustion, at a pressure of the order of one or two millimeters of mercury, it will be observed that the tube has a rose color, the principal bands appearing in the spectrum being those corresponding to nitrogen appearing on the scale at 687 and 627.8. The other point, throughout the length of the spectroscope scale, at this period of the operation, will be relatively indefinite and nebulus.

As the high tension current is passed through the gas, it will be found that the spectra spread becomes luminous, from red to violet, and one observes a rapid freeing of oxygen and particularly hydrogen as indicated by the bands 655.2, 486.2, 434, 410, etc. Finally the color of the tube changes, and the rose which still appears becomes white. The pressure gauge will also indicate an augmentation of pressure, which should be reduced to about two millimeters of mercury with the aid of the vacuum pump.

As the passage of the high tension current continues, the spectra of the tube will become clear and less spread out and one may observe a number of absorption bands notably in the blue and violet. The bands will become quite clear and brilliant particularly in the regions of the scale 655, 580, 575, 485, 450, etc. Then, little by little salts constituting the material of the tube itself will facilitate the chemical transformation of the mixture, and one will see appearing near the region 588, a yellow band which becomes more and more definite, particularly in the neighborhood of the electrodes of the tube. At the same time the pale band of hydrogen, that is to say the band 486.2, becomes darker and sometimes completely disappears. The operation is then completed and the high tension current shut off, and the tube is exhausted prior to the introduction of the pure filling gases. These gases, which may be a mixture of neon and helium, or neon alone, are then introduced and the tube completed in the usual way.

It will be noted that the final spectrum is quite different to that appearing at the commencement of the operation.

It will be found that the control of the operation by an observation of the spectrum, may be made very rapidly and with extreme accuracy. The formation of the electrodes and various technical details in the manufacture of the tubes may be constructed as well known in the art, or as described in the various copending applications I have hitherto filed.

As many changes could be made in the above construction, and many apparently widely different embodiments of my invention, within the scope of the claim, constructed without departing from the spirit or scope thereof, it is intended that all matter contained in the accompanying specification shall be interpreted as illustrative, and not in a limiting sense.

What I claim as my invention is:

In the manufacture of luminescent tubes, the herein described method of removing impurities and residual gases which consists in filling the tube at low pressure with a conducting gas adapted to effect combination of said impurities and residual gases, passing a high tension current through the conducting gas to thereby effect the desired combination of the said residual gases or impurities, observing the tube through a spectroscope, exhausting said tube when a yellow line appears in the region 588 of the spectroscope scale, and then filling the tube with its permanent gaseous filling.

In witness whereof I have hereunto set my hand.

PAUL FRANÇOIS JOSEPH LEBRUN.